United States Patent Office 3,160,593
Patented Dec. 8, 1964

3,160,593
MINERAL OIL COMPOSITIONS
William W. Spooncer, Richmond, Calif., assignor to Shell Oil Company, New York, N.Y., a corporation of Delaware
No Drawing. Filed Oct. 4, 1960, Ser. No. 60,305
15 Claims. (Cl. 252—49.8)

This invention relates to improved mineral oil compositions and to novel linear cyclic phosphorus-containing polymers therefor and to a process of preparing said polymers. More particularly, the invention relates to mineral oils containing high molecular weight linear cyclic phosphorus-containing polymers capable of improving the stability, detergency and extreme pressure properties of oils.

It is known that dialkenyl phosphorus-containing compounds such as diallyl phenyl phosphine oxide under certain reaction conditions form polycyclic compounds of low intrinsic viscosity and low molecular weights. Compounds of this type although they exhibit mild thermal stability are unsuited for use in mineral oils such as fuel oils or mineral lubricating oils because of their poor oil solubility, as well as poor properties with respect to detergency, extreme pressure and stability under severe temperature and pressure conditions.

It is an object of this invention to provide novel high molecular weight oil-soluble linear polymeric cyclic phosphorus-containing compounds. Another object is to provide high molecular weight oil-soluble linear cyclic phosphorus-containing compounds which possess good detergent and extreme pressure properties. Another object is to provide new and improved mineral oil compositions, especially lubricating oils, containing a stable high molecular weight linear cyclo-phosphorus polymer. These and other objects of the invention will be apparent from the detailed description thereof.

It has now been discovered that an oil-soluble high molecular weight linear cyclic phosphorus-containing polymer having an intrinsic viscosity of from 0.1 to 2 can be prepared by polymerizing under controlled temperature conditions in the presence of an azo or peroxide catalyst, preferably an organic peroxide and a chloro-organic solvent such as (a) chloro alkyl ethers or (b) chlorohydrocarbons, the former being preferred, a dialkenyl phosphorus containing compound having at least one P—C linkage the formula of which can be represented as

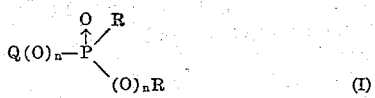
(I)

wherein R is an alkenyl radical, e.g. allyl, methallyl radical, Q is a hydrocarbyl radical such as aryl, aralkyl, alkaryl, alkyl or cycloalkyl radical of from 6 to 18 carbon atoms and at least one of the n's is 1 and the other n can be an integer of from 0 to 1, preferably 1.

In view of the above it is surprising to discover that by polymerizing dialkenyl phosphono compounds represented by Formula I in the presence of an azo catalyst or an organic peroxide at between 50° and 175° C. and a chlorine-containing solvent selected from (a) chloroalkyl ether or (b) chlorohydrocarbons such as chloroalkanes or chloroaromatics that oil-soluble, high molecular weight linear cyclic phosphorus polymers are obtained capable of imparting desirable oil-additive properties. By high molecular weight is meant molecular weights in the range from 10,000 to 100,000, preferably 15,000 to 50,000 having a plurality of units such as

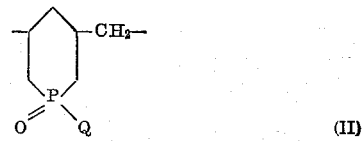
(II)

or

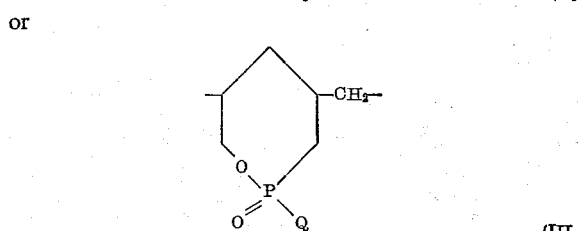
(III)

or

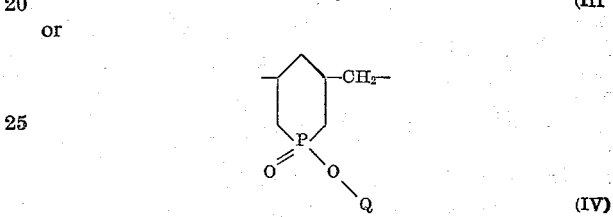
(IV)

or

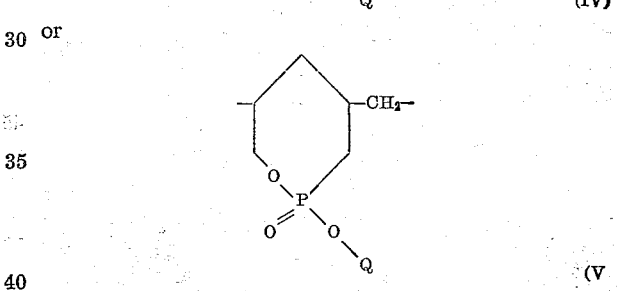
(V)

or mixtures of units (II) and (III).

When these dialkenyl phosphorus-containing monomers are polymerized with other polymerizable monomers such as described hereinafter, e.g. methacrylate esters of long chain alcohols or vinyl esters of long chain fatty acids or the like, copolymers of from 10,000 to 1,000,000 can be obtained.

The azo catalyst such as alpha,alpha'-azo-diisobutyronitrile is employed when the reaction temperature is low (50–80° C.) and the organic peroxide catalyst is used when the reaction temperature is high (80–175° C., preferably 125–150° C.). The organic peroxides may be aliphatic, aromatic, heterocyclic or alicyclic peroxides, such as diethyl peroxide, tertiary butyl hydroperoxide, di(tertiary butyl) peroxide, benzoyl peroxide, dimethyl thienyl peroxide, dilauroyl peroxide and urea peroxide. The catalysts are generally used in an amount 0.1% to 5% by weight of the reactants. Peroxide catalysts are preferred since reaction rates and yields are better.

The solvent which is so essential in the formation of linear polymers of the present invention include (a) chloroalkyl ethers such as dichloroethyl ether, dichloropropyl ether, dichlorobutyl ether or (b) chlorohydrocarbons such as chloroalkanes such as dichloroethane, dichloropropane, dichlorobutane; chloro-aromatic such as monochlorobenzene, dichlorobenzene, chlorotoluene, and mixtures thereof. The chloroalkyl ether solvents such as dichloroethyl ether in conjunction with a peroxide catalyst such as di (tertiarybutyl) peroxide are preferred since high molecular weight (15,000–50,000) linear polymers are obtained.

Suitable dialkenyl phosphono compounds for use in preparing the linear cyclic polymers of the present invention includes monomers having the general formula

(VI)

where any two of the groups $R_1$, $R_2$ and $R_3$ are alkenyl groups and the other group is hydrogen, alkyl, cycloalkyl, aryl, alkaryl or aralkyl. Preferably $R_1$ and $R_2$ are alkenyl radicals. The alkenyl radicals may be $\alpha:\beta$ mono-olefinically unsaturated hydrocarbon radicals, $\alpha$ or $\beta$-allyl substituted vinyl radicals, but preferably the alkenyl radicals are $\beta:\gamma$ mono-olefinically unsaturated hydrocarbon radicals of the formula $-CR'_2-CR'=CR'_2$, where $R'$ is a hydrogen atom or an alkyl group preferably having up to six carbon atoms. The alkenyl radicals may be the same or different but are preferably the same, more preferably they are allyl radicals. The above dialkenyl derivatives of phosphonic acid may be prepared by any of the methods well-known in the art. For example, if $R_1$ and $R_2$ are alkenyl radicals, the dialkenyl phosphonates may be conveniently prepared by reacting the desired phosphonic dihalide with the desired mono-olefinically unsaturated alcohol in the presence of an acid-sequestrant, e.g. pyridine to produce the diester. When $R_2$ and $R_3$ are dialkenyl radicals, the desired compounds may be prepared by an Arbuzov reaction on a dialkyl alkenyl phosphite with an alkenyl halide.

Examples of suitable dialkenyl derivatives of phosphonic acid are diallyl phenylphosphonate, diallyl ethylphosphonate, dimethallyl ethylphosphonate, the monoallyl ester of allylphosphonic acid, allyl methallyl phenylphosphonate, diallyl benzylphosphonate, diallyl phenylphosphonate and allyl-2-propane phenylphosphonate.

A further class of dialkenyl phosphorus monomers that may be used in forming the polymers of the present invention has the general formula:

(VII)

where two of the groups $R_1$, $R_2$ and $R_3$ are alkenyls and the other group is hydrogen, alkyl, cycloalkyl, aryl, aralkyl or alkaryl. Preferably $R_1$ is an alkenyl or cycloalkenyl radical. The alkenyl radicals may be $\alpha:\beta$ mono-olefinically unsaturated hydrocarbon radicals, e.g. $\alpha$- or $\beta$-alkyl substituted vinyl radicals, but preferably the alkenyl radicals are $\beta:\gamma$ mono-olefinically unsaturated hydrocarbon radicals of the formula $-CR'_2-CR'=CR'_2$, where $R'$ is a hydrogen atom or an alkyl group preferably having up to six carbon atoms. The alkenyl radicals may be the same or different but are preferably the same, more preferably they are allyl radicals. The above dialkenyl derivatives of phosphinic acid may be readily prepared by any of the methods known in the art.

If $R_1$ is alkenyl the $\beta:\gamma$ mono-olefinically unsaturated derivatives may be prepared by direct esterification of an alkenyl phosphinic acid with the desired $\beta:\gamma$ mono-olefinically unsaturated alcohols. Alternatively if $R_1$ is alkenyl and both alkenyl radicals in the product are to be the same, a convenient method of preparation is to react a phosphonous dichloride with the desired $\beta:\gamma$ mono-olefinically unsaturated alcohol to form the diester of a phosphinous acid which partially undergoes an Arbuzov re-arrangement to form the ester of the corresponding phosphinic acid which may be separated from the reaction mixture by distillation.

If $R_2$ and $R_3$ are both alkenyl radicals, the desired product may be obtained by reacting a phosphorodihalidate of the formula $ROP(O)X_2$ with an alkenyl Grignard reagent, e.g. $R'M_gBr$ ($R'$ is alkenyl) to form $ROP(O)R'_2$. Examples of such compounds are diallyl phosphinic acid, allylmethallylphosphinic acid, ethyl diallylphosphinate, phenyl diallyl phosphinate and methyl allylmethallylphosphinate, lauryl diallyl phosphinate.

A still further class of dialkenyl phosphorus compounds useful in the present invention is that having the general formula:

(VIII)

where $R_1$ and $R_2$ are alkenyl radicals and $R_3$ is a hydrogen atom or an alkyl, cycloalkyl, aryl, aralkyl, or alkaryl radical. $R_1$ and $R_2$ may be $\alpha:\beta$ mono-olefinically unsaturated hydrocarbon radicals, e.g. vinyl or $\alpha$- or $\beta$-alkyl substituted vinyl radicals, but preferably $R_1$ and $R_2$ are $\beta:\gamma$ mono-olefinically unsaturated hydrocarbon radicals of the formula $-CR'_2-CR'=CR'_2$, where $R'$ is a hydrogen atom or an alkyl group preferably having up to six carbon atoms. $R_1$ and $R_2$ may be the same or different, but preferably they are the same and more preferably they are allyl groups. Exemplary of suitable phosphine oxides are diallyl phenyl phosphine oxide, diallyl ethyl phosphine oxide, diallyl benzyl phosphine oxide, allyl methallyl phenyl phosphine oxide, dimethallyl phenyl phosphine oxide, dimethallyl isopropylphosphine oxide and diallyl lauryl phosphine oxide.

Mixtures of two or more of the foregoing monomers can be used if desired or these monomers can be copolymerized with other polymerizable mono-olefinically unsaturated compounds having an oleophilic hydrocarbon chain of at least 8 carbon atoms with which the foregoing phosphorus compounds may be copolymerized are acrylic acid and $\alpha$-substituted acrylic acids and their derivatives, such as their esters, nitriles and amides. Examples of such compounds are $C_{8-18}$ alkyl substituted ethacrylic acid, $\alpha$-dicresyl acrylic acid, the alkyl esters thereof, e.g. octyl, nonyl, lauryl, cetyl, oleyl, stearyl and dimethylcyclohexyl esters, $\alpha$-ethylhexylacrylamide, laurylacrylamide, $\alpha$-octacrylonitrile, 2-butyl 2-hexenenitrile, 2-propyl 2-octenenitrile, 2-chloroethyl 2-hexenenitrile, 2-ethyl 3-chloro 2-hexenenitrile, 2-isopropyl 3-bromo 2-cotenenitrile, and $\alpha$-octyl $\beta$-cyclohexylacrylonitrile.

Other compounds which may be used to form the copolymers used in the present invention are vinyl esters or organic acid such as vinyl laurate, vinyl stearate, vinyl ethers such as vinyl octyl ether, vinyl lauryl ether, vinyl dicresyl ether, vinyl ketones such as octyl vinyl ketone, lauryl vinyl ketone, and stearyl vinyl ketone, vinyl aryl compounds such as ortho-octyl styrene, para-lauryl styrene, para-stearyl styrene, $\alpha$-octyl styrene and other alkyl derivatives of styrene in which a $C_{8-18}$ alkyl group or groups may be substituted in the ring or in the side chain or both. Allyl esters, ethers and ketones corresponding to the vinyl compounds listed above may also be used. $\alpha,\beta$-unsaturated polycarboxylic acids and their derivatives such as maleic, fumaric, citraconic, itaconic, crotonic, aconitic and tricarballylic acids and their mono-polyesters with aliphatic and aromatic alcohols, and their amides and nitriles, may also be used.

Other compounds which may be used to form the phosphorus containing copolymers used in the present invention are the $\alpha$-olefins particularly those having more than 8 and preferably 12–20 carbon atoms, amino-substituted olefins, e.g. p-($\beta$-dioctylaminoethyl)styrene and nitrogen-containing heterocyclic compounds having a mono-olefinically unsaturated substituent, e.g. the vinyl pyridines (whether 2-, 3- or 4-substituted) and the vinyl alkyl pyridine, 3-lauryl-5-vinyl pyridines, 4-lauryl-2-vinyl pyridine, 4-stearyl-2-vinyl pyridine and 2-stearyl-5-vinyl pyridine. Vinyl lactams are also suitable monomers, particularly the N-vinyl pyrrolidone or N-vinyl piperidone. These vinyl compounds should have at least one $C_{2-15}$ alkyl radical in the molecule.

Of the above listed monomers copolymerizable with the phosphorus containing monomers according to the present invention, it is preferred that they contain at least one oleophilic hydrocarbon chain of at least eight carbon atoms which is preferably an alkyl radical of 12 to 20 carbon atoms, and such copolymers per se are a feature of the present invention. Mixtures of the above monomers may be used in forming the copolymers used in lubricating oil additives according to the present invention. Particularly preferred copolymers are those formed from dialkenyl substituted phosphorus compounds with a higher alkyl ester of an acrylic or methacrylic acid, i.e. where the ester group contains 8 or more carbon atoms, e.g. lauryl methacrylate. Minor proportions of lower alkyl esters of acrylic or methacrylic acids, e.g. methyl methacrylate, may advantageously be present in such copolymers.

The molar ratio of phosphorus containing monomer to the polymerizable comonomer may vary within wide limits and generally lies between 20:1 and 1:20. Preferably the ratio lies between 1:1 and 1:20, with ratios between 1:3 and 1:10 being especially suitable.

The following examples illustrate methods of producing polymers and copolymers of the present invention.

EXAMPLE I

About 5 grams of allylphenyl-2-propene phosphonate in $\beta,\beta'$dichloroethyl ether solvent (5 ml.) containing di-tert.butyl peroxide (0.15 gram) was heated for about six hours at 150° C. The solvent was removed at reduced pressure and the residue dissolved in benzene and the polymer precipitated with ether by centrifugation. The desired linear polymer (72% yield) had a phosphorus content of 11.3% and a molecular weight of 26,000 determined by light scattering in methyl ethyl ketone and comprised of a plurality of units represented by

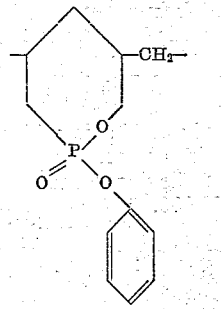

When the above reaction was repeated using ethyl ether or benzene as the solvent, the resulting polymer yields were about 15% and the molecular weight of the polymer was around 1,000–1,500.

EXAMPLE II

Diallylphenylphosphine oxide in dichloroethane and di-tert.butyl peroxide catalyst was heated for six hours at 130° C. The polymer was precipitated with diethyl ether, collected as washed by filtration and dried at reduced pressure to leave a linear cyclic polymer having a molecular weight of about 5,000 as determined by light scattering having a plurality of

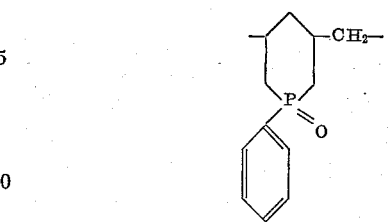

units.

EXAMPLE III

One mol of diallylphenylphosphine oxide and four mols of lauryl methacrylate were dissolved in $\beta,\beta'$-dichloroethyl ether containing 0.1% di-tert.butyl peroxide and the mixture was heated for 24 hours at 130° C. The polymer was then precipitated and dried in the manner described in Example I. The resulting copolymer having units of

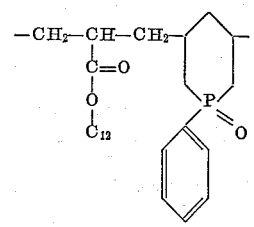

was oil-soluble and exhibited detergent and extreme pressure properties.

Using the same procedure, the following polymers and copolymers may be prepared.

| Example | Monomer [1] | Solvent | Catalyst | Temperature, °C. |
|---|---|---|---|---|
| IV | Dimethallyl lauryl phosphonate | $\beta,\beta'$-dichloroethyl ether | Dibenzoyl peroxide | 150 |
| V | Dimethallyl lauryl phosphinic acid | Chlorobenzene | Ditert.butyl peroxide | 130 |
| VI | Allyl prop-2-enyl phosphonate (1)/lauryl methacrylate (4). | $\beta,\beta$,dichloroethyl ether | do | 150 |
| VII | Allyl lauryl-2-propene phosphonate (1)/vinyl stearate (4) | do | $\alpha,\alpha'$-azo-diisobutyronitrile | 60 |
| VIII | Diemthallyl phenyl phosphine oxide (1)/oleyl maleate (10). | do | Ditert.butyl peroxide | 150 |

[1] Figures in ( ) indicate mol ratio of reactants.

Polymers of this invention which are difficultly soluble in mineral oil can be solubilized by copolymerizing with polymerizable monomers containing oil-solubilizing radicals as illustrated by Examples III and VI to VIII or by addition of solubilizers such as $C_{8-20}$ alkanols, e.g. lauryl or stearyl alcohol or the so-called "OXO" alcohols derived from branched-chain olefins, such as polymers of lower alkenes of 3 to 5 carbon atoms, and copolymers of mixtures of such alkenes, by catalyzed reaction with carbon monoxide and hydrogen in accordance with the conditions of the "OXO" process, as is well known in the art. The composition of a typical $C_8$-OXO-alcohol mixture derived from a mixture of $C_7$-olefins, produced by polymerization of a typically refinery cracked gas fraction of $C_3$–$C_4$ hydrocarbons is given below:

Alcohol: Percent, wt.
3,5-dimethyl hexanol _____ 29
4,5-dimethyl hexanol _____ 25
3,4-dimethyl hexanol _____ 17
5-methyl heptanol }
3-methyl heptanol } _____ 16
5-ethyl hexanol _____ 2.3
5,5-dimethyl hexanol _____ 1.4
Alpha-alkyl alkanols _____ 4.3
Others _____ 5.0

Other examples of suitable alkanols include 6-methyl-1-heptanol, 2-n-propyl-1-pentanol, 3-n-propyl-1-hexanol, 2, 2-dimethyl-1-octanol, 10,10-dimethyl-1-undecanol, 3-isopropyl-1-heptanol and mixtures thereof. The solubilizers can be used in amounts of from 0.1% to 10% based on the total composition.

When desired, additional improvements with respect to oxidation stability and scuffing inhibition can be imparted to the oil compositions containing the polymers of this invention by incorporating small amounts (0.01%–2%, preferably 0.1%–1) of phenolic antioxidant such as alkylphenol, e.g., 2,6-ditertbutyl-4-methylphenol or p,p'-methylene bisphenols such as 4,4'-methylene bis(2,6-ditertbutyl phenol) or arylamines such as phenyl-alpha-naphthyl-amine and mixtures thereof. Anti-scuffing agents include organic phosphites, phosphates, phosphonates and their thio-derivatives, such as $C_{3-18}$ alkyl phosphites, or phosphonates, e.g., di- and tributyl, octyl, lauryl, stearyl, cyclohexyl, benzyl, cresyl, phenyl, phosphites or phosphates as well as their thio-derivatives, $P_2S_5$-terpene reaction products, e.g., $P_2S_5$-pine oil reaction product and alkali metal salts thereof such as a potassium salt of a $P_2S_5$-terpene reaction product, phosphonates such as dibutyl methanephosphonate, dibutyl trichloromethanephosphonate, dibutyl monochloromethanephosphonate, dibutyl chlorobenzenephosphonate, and the like. The full esters of pentavalent phosphorus acids such as triphenyl, tricresyl, trilauryl and tristearyl ortho-phosphates or potassium salts of $P_2S_5$-terpene reaction product are preferred.

The polymeric additives of this invention improve various petroleum products such as mineral lubricating oil by the incorporation of a minor amount (0.001% to 10% by weight) of the additive. The polymers are particularly useful, especially at concentrations of from about 0.001% to about 5% by weight, in refined mineral lubricating oils, especially in non-ash formulations thereof. Suitably such lubricating oils range from SAE 5W viscosity grade to SAE 140 grade and are derived from paraffinic, naphthenic or asphaltic base crudes. Representative oils are refined high viscosity index mineral oils having a viscosity of 100° F. of 100 to 250 SUS. A typical mineral lubricating oil (X) of this type had the following properties:

| | |
|---|---|
| Gr. ° API, 60/60° F | 32 |
| Flash, ° F | 370 |
| Viscosity Index (Dean and Davis) | 93 |
| Viscosity, SUS at 100° F | 103 |

The following non-ash compositions are representative of this aspect of the invention:

Composition A:
    Example I copolymer _____ 0.2% wt.
    Mineral lubricating oil (X) _____ Balance.
Composition B:
    Example II polymer _____ 0.2% wt.
    Mineral lubricating oil (X) _____ Balance.
Composition C:
    Example III polymer _____ 0.5% wt.
    Mineral lubricating oil (X) _____ Balance.
Composition D:
    Example IV polymer _____ 0.2% wt.
    $C_{13}H_{27}OH$ ("OXO" alcohol) _____ 6% wt.
    Mineral lubricating oil (X) _____ Balance.
Composition E:
    Example V copolymer _____ 2% wt.
    $C_{13}H_{27}$ ("OXO alcohol) _____ 4% wt.
    Mineral lubricating oil (X) _____ Balance.
Composition F:
    Example VIII copolymer _____ 3% wt.
    4,4'-methylene bis(2,6-ditertbutylphenol) _ 1% wt.
    Mineral lubricating oil (Aviation oil 1100 grade) _____ Balance.
Composition G:
    Example V copolymer _____ 5% wt.
    4,4'-methylene bis(2,6-ditertbutylphenyl) _ 0.5% wt.
    Tricresyl phosphate _____ 0.8% wt.
    Mineral lubricating oil (X) _____ Balance.

Lubricating compositions of the present invention such as compositions A, B, E, F and G exhibit excellent thermal stability and detergent properties when tested in engines operating both under "stop-and-go" driving conditions and under severe temperature and pressure conditions leaving the engine in a clean condition, with essentially no sign of wear.

I claim as my invention:

1. A mineral oil composition comprising a major amount of mineral oil and from about 0.001% to about 5% of an oil-soluble linear cyclic phosphorus-containing polymer obtained by reacting in the presence of an oxygen-yielding catalyst at between 50 and 175° C., a dialkenyl phosphorus-containing compound having a P-C linkage selected from the group consisting of dialkenyl esters of phosphonic acid, and phosphinic acid and phosphine oxide, in a chloro organic solvent selected from the group consisting of (a) chloroalkyl ether and (b) chlorohydrocarbon, the linear cyclic phosphorus-containing polymer having a molecular weight in the range of from 10,000 to 100,000.

2. A mineral oil composition comprising a major amount of mineral oil and from about 0.001% to about 5% of an oil-soluble linear cyclic phosphorus-containing polymer obtained by reacting in the presence of an organic peroxide catalyst at between 75° C. and 175° C., a diallyl phosphorus compound having a P-C linkage selected from the group consisting of diallyl esters of phosphonic acid, phosphinic acid and phosphine oxide, in the presence of a chloroalkyl ether solvent, the polymer having a molecular weight of from 15,000 to about 50,000.

3. A mineral oil composition comprising a major amount of mineral oil and from about 0.001% to about 5% of an oil soluble linear cyclic phosphorus-containing polymer obtained by reacting in the presence of an azo catalyst at between 50° and 80° C., a diallyl phosphorus compound having a P-C linkage selected from the group consisting of diallyl esters of phosphonic acid, phosphinic acid and phosphine oxide, in the presence of a chloroalkyl ether solvent, the polymer having a molecular weight of from 15,000 to about 50,000.

4. A mineral oil composition comprising a major amount of mineral oil and from about 0.001% to about 5% of an oil-soluble linear cyclic phosphorus-containing polymer obtained by reacting in the presence of an organic peroxide catalyst at between 75° C. and 175° C., a diallyl phosphorus compound having a P-C linkage selected from the group consisting of diallyl esters or phosphonic acid, phosphinic acid and phosphine oxide, in the presence of a chlorobenzene solvent, the polymer having a molecular weight of from 15,000 to about 50,000.

5. A mineral oil composition comprising a major amount of mineral oil and from about 0.001% to about 5% of an oil-soluble linear cyclic phosphorus-containing polymer obtained by reacting in the presence of an azo catalyst at between 50° C. and 80° C., a diallyl phosphorus compound having a P-C linkage selected from the group consisting of diallyl esters of phosphonic acid, phosphinic acid and phosphine oxide, in the presence of a chlorobenzene solvent, the polymer having a molecular weight of from 15,000 to about 50,000.

6. A mineral oil composition comprising a major amount of mineral oil and from about 0.001% to about 5% of an oil-soluble linear cyclic phosphorus-containing polymer obtained by reacting in the presence of an organic peroxide catalyst at between 75° C. and 175° C., a diallyl aryl phosphine oxide, in the presence of a beta,beta'-dichloroethyl ether solvent, the polymer having a molecular weight of from 15,000 to about 50,000.

7. A mineral oil composition comprising a major amount of mineral oil and from about 0.001% to about 5% of an oil-soluble linear cyclic phosphorus-containing polymer obtained by reacting in the presence of an organic peroxide catalyst at between 75° C. and 175° C., an allyl aryl propene phosponate, in the presence of a beta,beta'- dichloroethyl ether solvent, the polymer having a molecular weight of from 15,000 to about 50,000.

8. A mineral oil composition comprising a major amount of mineral oil and from about 0.001% to about 5% of an oil-soluble linear cyclic phosphorus-containing polymer obtained by reacting in the presence of an organic peroxide catalyst at between 75° C. and 175° C., a diallyl phenyl phosphine oxide, in the presence of a beta,-beta'-dichloroethyl ether solvent, the polymer having a molecular weight of from 15,000 to about 50,000.

9. A mineral oil composition comprising a major amount of mineral oil and from about 0.001% to about 5% of an oil-soluble linear cyclic phosphorus-containing polymer obtained by reacting in the presence of an organic peroxide catalyst at between 75° C. and 175° C., an allyl phenyl-2-propene phosphonate, in the presence of a beta,-beta'-dichloroethyl ether solvent, the polymer having a molecular weight of from 15,000 to about 50,000.

10. A mineral oil composition comprising a major amount of mineral oil and from about 0.001% to about 5% of an oil-soluble linear copolymer of a dialkenyl phosphorus-containing compound having a P-C linkage selected from the group consisting of dialkenyl ester of phosphonic acid, phosphinic acid and phosphine oxide and a polymerizable mono-olefinically unsaturated compound containing a $C_{8-20}$ alkyl chain selected from the group consisting of alkyl acrylate ester, vinyl aliphatic carboxylate ester and alkenyl maleate ester in the mol ratio of 20:1 to 1:20, respectively obtained by reacting the monomer mixture in a chloro-organic solvent selected from the group consisting of (a) chloroalkyl ether and (b) chlorohydrocarbon at between 50° C. and 175° C. in the presence of an oxygen-yielding catalyst, the copolymer having a molecular weight in the range of from 10,000 to 1,000,000.

11. A mineral oil composition comprising a major amount of mineral oil and from about 0.001% to about 5% of an oil-soluble linear copolymer of dialkenyl phosphorus-containing compound having a P-C linkage selected from the group consisting of dialkenyl ester of phosphonic acid, phosphinic acid and phosphine oxide and a $C_{8-20}$ alkyl acrylate obtained by reacting the monomer mixture in the mol ratio of 1:1 to 1:20, respectively in a chloroalkyl ether solvent at between 50° C. and 175° C. in the presence of an organic peroxide catalyst, the copolymer having a molecular weight in the range of from 10,000 to 1,000,000.

12. A mineral oil composition comprising a major amount of mineral oil and from about 0.001% to about 5% of an oil-soluble linear copolymer of allyl aryl phosphine oxide and a $C_{8-20}$ alkyl acrylate obtained by reacting the monomer mixture in the mol ratio of 1:1 to 1:20, respectively in a chloroalkyl ether solvent at between 50° C. and 175° C. in the presence of an organic peroxide catalyst, the copolymer having a molecular weight in the range of 10,000 to 1,00,000.

13. A mineral oil composition comprising a major amount of mineral oil and from about 0.001% to about 5% of an oil-soluble linear copolymer of allyl aryl propene phosphonate and a $C_{8-20}$ alkyl acrylate obtained by reacting the monomer mixture in the mol ratio of 1:2 to 1:10, respectively in a chloroalkyl ether solvent at between 50° C. and 175° C. in the presence of an organic peroxide catalyst, the copolymer having a molecular weight in the range of from 10,000 to 1,000,000.

14. A mineral oil composition comprising a major amount of mineral oil and from about 0.001% to about 5% of an oil-soluble linear copolymer of diallyl phenyl phosphine oxide and lauryl methacrylate obtained by reacting the monomer mixture in the mol ratio of 1:2 to 1:10, respectively in beta,beta'-dichloroethyl ether in the presence of ditert.butyl peroxide catalyst at between 75° C. and 175° C., the copolymer having a molecular weight of from 50,000 to 1,000,000.

15. A mineral oil composition comprising a major amount of mineral oil and from about 0.001% to about 5% of an oil-soluble linear copolymer of allyl phenyl-2-propene phosphonate and lauryl methacrylate obtained by reacting the monomer mixture in the mol ratio of 1:2 to 1:10, respectively in beta,beta'-dichloroethyl ether in the presence of ditert.-butyl peroxide catalyst at between 75° C. and 175° C., the copolymer having a molecular weight of from 50,000 to 1,000,000.

References Cited by the Examiner
UNITED STATES PATENTS

| | | | |
|---|---|---|---|
| 2,659,714 | 11/53 | Harman et al. | 252—49.8 X |
| 2,694,684 | 11/54 | Rogers et al. | 252—49.8 |
| 2,711,403 | 6/55 | Stiles et al. | 252—49.8 X |
| 2,779,739 | 1/57 | Spivock | 252—49.8 |
| 2,909,559 | 10/59 | Lanham | 260—461 |
| 2,963,437 | 12/60 | Ries | 252—49.8 |
| 2,971,019 | 2/61 | Ladd et al. | 260—461 |

DANIEL E. WYMAN, *Primary Examiner.*

JULIUS GREENWALD, *Examiner.*